United States Patent
Barbieri et al.

(10) Patent No.: US 7,829,640 B2
(45) Date of Patent: Nov. 9, 2010

(54) RECIRCULATION LOOP REACTOR BULK POLYMERIZATION PROCESS

(75) Inventors: Mark D. Barbieri, Macomb Township, MI (US); Richard W. St. Coeur, Marysville, MI (US); John K. Tynan, Jr., Port Huron, MI (US); Mark A. Lewandowski, Fort Gratiot, MI (US)

(73) Assignee: Intertape Polymer Corp., Bradenton, FL (US)

( * ) Notice: Subject to any disclaimer, the term of this patent is extended or adjusted under 35 U.S.C. 154(b) by 488 days.

(21) Appl. No.: 11/845,807

(22) Filed: Aug. 28, 2007

(65) Prior Publication Data

US 2008/0058483 A1 Mar. 6, 2008

Related U.S. Application Data

(60) Provisional application No. 60/841,079, filed on Aug. 30, 2006, provisional application No. 60/853,578, filed on Oct. 23, 2006.

(51) Int. Cl.
  *C08F 2/02* (2006.01)
  *B01J 19/18* (2006.01)
  *C08F 20/10* (2006.01)

(52) U.S. Cl. .................. 526/64; 526/88; 526/918; 422/132; 422/135; 422/137

(58) Field of Classification Search .............. 526/64, 526/88, 918; 422/132, 135, 137
See application file for complete search history.

(56) References Cited

U.S. PATENT DOCUMENTS

| | | | |
|---|---|---|---|
| 3,551,396 A | 12/1970 | Lanthier | |
| 3,821,330 A | 6/1974 | Free | |
| 3,968,059 A | 7/1976 | Shimada et al. | |
| 3,991,129 A | 11/1976 | Daniels | |
| 4,061,708 A | 12/1977 | Lazarus et al. | |
| 4,158,571 A | 6/1979 | Lynch et al. | |
| 4,192,637 A | 3/1980 | Chong | |
| 4,209,599 A | 6/1980 | Brady et al. | |
| 4,220,580 A | 9/1980 | Rowatt | |
| 4,275,177 A | 6/1981 | Walkenhorst et al. | |
| 4,289,409 A | 9/1981 | Brand | |

(Continued)

FOREIGN PATENT DOCUMENTS

DE 19548136 6/1997

(Continued)

OTHER PUBLICATIONS

Web page of Fluitec, "Mixer/Heat-Exchangers," http://www.fluitec.ch (date of first publication unknown).

(Continued)

*Primary Examiner*—Fred M Teskin
(74) *Attorney, Agent, or Firm*—Thompson Hine LLP

(57) ABSTRACT

A process for producing polymer and more particularly adhesive using a recirculating loop reactor. In one embodiment the reactor includes one or more mixers to mix feed stock with the polymerized material recirculating in the reactor. In another embodiment a planetary roller extruder (PRE) may be used for this purpose. In still another embodiment, a combination of one or more static mixers and one or more PREs may be used.

21 Claims, 4 Drawing Sheets

U.S. PATENT DOCUMENTS

| | | | |
|---|---|---|---|
| 4,324,868 | A | 4/1982 | Maeda |
| 4,393,171 | A | 7/1983 | Bracke et al. |
| 4,487,897 | A | 12/1984 | Matsuoka et al. |
| 4,515,008 | A | 5/1985 | Matsushita et al. |
| 4,546,160 | A | 10/1985 | Brand et al. |
| 4,595,709 | A | 6/1986 | Reischl |
| 4,619,979 | A | 10/1986 | Kotnour et al. |
| 4,810,523 | A | 3/1989 | Williams et al. |
| 4,814,373 | A | 3/1989 | Frankel et al. |
| 4,843,134 | A | 6/1989 | Kotnour et al. |
| 4,849,489 | A | 7/1989 | Benhamou et al. |
| 4,898,897 | A | 2/1990 | Kiyohara et al. |
| 4,968,535 | A | 11/1990 | Terai et al. |
| 5,194,525 | A * | 3/1993 | Miura et al. ............ 526/64 |
| 5,210,132 | A | 5/1993 | Matsubara et al. |
| 5,362,448 | A | 11/1994 | Kawakami et al. |
| 5,484,882 | A | 1/1996 | Takada et al. |
| 5,521,263 | A | 5/1996 | Seeger et al. |
| 5,539,033 | A | 7/1996 | Bredahl et al. |
| 5,599,888 | A | 2/1997 | Higuchi et al. |
| 5,602,216 | A | 2/1997 | Juvet |
| 5,637,646 | A | 6/1997 | Ellis |
| 5,637,662 | A | 6/1997 | Relvini et al. |
| 5,641,281 | A | 6/1997 | Russell et al. |
| 5,703,184 | A | 12/1997 | Fujita et al. |
| 5,726,258 | A * | 3/1998 | Fischer et al. ............ 526/64 |
| 5,744,555 | A | 4/1998 | Ames et al. |
| 5,801,224 | A | 9/1998 | Narayan et al. |
| 5,886,112 | A | 3/1999 | Vuillemin et al. |
| 5,902,865 | A * | 5/1999 | Gausepohl et al. ............ 526/64 |
| 5,952,449 | A | 9/1999 | Aminaka et al. |
| 5,962,604 | A | 10/1999 | Rath |
| 6,074,084 | A | 6/2000 | Kolossow |
| 6,100,360 | A | 8/2000 | Twu et al. |
| 6,100,369 | A | 8/2000 | Miyajima et al. |
| RE36,855 | E | 9/2000 | Bredahl et al. |
| 6,162,879 | A | 12/2000 | Galewski |
| 6,184,285 | B1 | 2/2001 | Hatfield et al. |
| 6,197,264 | B1 | 3/2001 | Korhonen et al. |
| 6,288,196 | B1 | 9/2001 | Takahashi et al. |
| 6,362,296 | B1 | 3/2002 | Singahal et al. |
| 6,380,345 | B1 | 4/2002 | Uenishi et al. |
| 6,388,026 | B1 | 5/2002 | Campbell et al. |
| 6,399,703 | B1 | 6/2002 | Fischer et al. |
| 6,461,574 | B2 | 10/2002 | Korhonen et al. |
| 6,593,434 | B1 | 7/2003 | Watanabe |
| 6,632,907 | B1 | 10/2003 | Mizota et al. |
| 6,641,627 | B2 | 11/2003 | Keipert et al. |
| 6,703,478 | B2 | 3/2004 | Nakane et al. |
| 6,726,465 | B2 | 4/2004 | Groleau |
| 6,740,400 | B2 | 5/2004 | Kato et al. |
| 6,780,271 | B1 | 8/2004 | Burmeister et al. |
| 6,906,150 | B2 | 6/2005 | Kommareddi et al. |
| 6,926,873 | B1 | 8/2005 | Filippi et al. |
| 6,946,519 | B2 | 9/2005 | Okubo et al. |
| 6,955,277 | B2 | 10/2005 | Smith et al. |
| 6,979,717 | B2 | 12/2005 | Moore |
| 7,279,535 | B2 | 10/2007 | Konig et al. |
| 2003/0149165 | A1 | 8/2003 | Brown et al. |
| 2003/0236374 | A1 | 12/2003 | Bardman et al. |
| 2004/0202814 | A1 | 10/2004 | Moeller et al. |
| 2004/0235978 | A1 | 11/2004 | Husemann et al. |
| 2005/0170086 | A1 | 8/2005 | Tynan, Jr. et al. |
| 2007/0055032 | A1 | 3/2007 | Langenbuch et al. |
| 2007/0173622 | A1 * | 7/2007 | Tynan et al. ............ 526/319 |
| 2008/0058482 | A1 | 3/2008 | Marx et al. |

FOREIGN PATENT DOCUMENTS

| | | |
|---|---|---|
| DE | 19638094 | 3/1998 |
| EP | 1056584 | 12/2000 |
| EP | 1067352 | 1/2001 |
| EP | 1080865 | 3/2001 |
| WO | 2004/101626 | 11/2004 |
| WO | 2004/101627 | 11/2004 |
| WO | 2007/087465 | 8/2007 |

OTHER PUBLICATIONS

Web page of Fluitec, "Adhesives," http:www.fluitec.ch (date of first publication unknown).

Product information entitled "Marlotherm® LH Heat Transfer Fluid," by Sasol Olefins & Surfactants GmbH, pp. 1-3 (Sep. 2004).

Product information entitled, "Zenith Pumps," by Zenith Pumps (Oct. 2004).

International Search Report issued regarding International Application No. PCT/US2007/076939 (Jan. 18, 2008).

Written Opinion of the International Searching Authority issued regarding International Application No. PCT/US2007/076939 (Jan. 18, 2008).

International Preliminary Report on Patentability, PCT/US2007/076939 (Mar. 12, 2009).

Benjamin Moore & Co., "Super Spec Latex Enamel Undercoater & Primer Sealer 254," 2 pages (Jun. 2002).

International Search Report and Written Opinion, International Application No. PCT/US07/60202 , 6 pages (Oct. 2, 2007).

Office Action, U.S. Appl. No. 11/620,835, 14 pages (Dec. 23, 2008).

Office Action, U.S. Appl. No. 11/620,835, 16 pages (May 21, 2009).

Advisory Action, U.S. Appl. No. 11/620,835, 8 pages (Aug. 6, 2009).

Office Action, U.S. Application No. 12/242,108, 16 pages (Dec. 16, 2009).

Satas, D., "Handbook of Pressure Sensitive Adhesive Technology," 1999, 3rd Ed., pp. ii-xi, 444-445, 486-487, 632-633, 684-685.

Supplementary European Search Report, European Application No. 7709980.2, 7 pages (Apr. 15, 2009).

European Search Report, European Application No. 09012412.4; 6 pages (Jan. 4, 2010).

"Rubber—The Tailor-Made Material. Compounding of Elastomer Masses in a Planetary Roller Extruder." by ENTEX (17 pages) (alleged to be Jan. 2003).

Office Action, Chinese Application No. 200780000114.4; 5 pages (Apr. 6, 2010).

European Search Report, European Application No. 10154282.7, 6 pages (Apr. 16, 2010).

CN, First Office Action, Chinese Application No. 200780027076.1, 10 pages (May 13, 2010).

Dietmar Weiss et al., "High-Quality Extrusion by Using Planetary Roller Extruder," *Journal of Qingdao Institute of Chemical Technology*, vol. 11, No. 3, pp. 105-108, 1990.

* cited by examiner

RECIRCULATION LOOP REACTOR BULK POLYMERIZATION PROCESS

CROSS REFERENCE TO RELATED APPLICATIONS

This application claims the benefit of U.S. Provisional Application Ser. No. 60/841,079 filed on Aug. 30, 2006 and U.S. Provisional Application Ser. No. 60/853,578 filed on Oct. 23, 2006.

BACKGROUND OF INVENTION

This application is directed to a continuous bulk polymerization processes and associated apparatuses for preparing polymeric compositions using a recirculation tubular loop reactor system and, more particularly, a continuous bulk polymerization process and associated apparatuses for preparing polymeric compositions, such as adhesives, using a recirculation tubular loop reactor including a planetary roller extruder (PRE).

Conventional bulk polymerization processes for producing adhesives by polymerization are known in the art. One such process includes a stirred tank reactor having a cooling jacket for removing heat from the vessel generated during the exothermic reaction therein. Such conventional processes have been somewhat effective at low conversion rates. However, at high conversion rates and associated high viscosities, the heat transfer surfaces often foul, thereby losing temperature control and facilitating runaway reactions. Mandating low conversion rates has not presented an economical solution to the problem since the excessive monomer used in low conversion operations must eventually be removed from the polymer by, for example, drying, de-volatilization or the like, thereby adding an additional processing step and associated costs.

SUMMARY OF INVENTION

In one aspect, a recirculation tubular loop reactor process for polymerization may include the steps of (a) preparing a feed stock by mixing at least one monomer with at least one initiator, the activation of which begins when the initiator is heated above an activation temperature, (b) heating the mixture to at least the activation temperature of the initiator to produce a partially polymerized intermediate, (c) recirculating a portion of the partially polymerized intermediate in the loop reactor, (d) directing a remaining portion of the polymerized intermediate into a stream for removal from the loop reactor, (e) cooling the recirculating intermediate below the activation temperature of the initiator, (f) mixing the cooled recirculating intermediate with additional feed stock, (g) optionally removing unreacted monomer from the remaining portion of the polymerized intermediate through drying, devolatilization, or the like and, (h) optionally applying the remaining portion to a web-form material.

In one embodiment of the invention, static mixers are used in the loop reactor to mix the feed stock and to mix the mixed feed stock with the recirculated partially polymerized intermediate. In another embodiment, a planetary roller extruder is used in the loop reactor for this purpose.

Static mixers can be advantageous for use in the loop reactor because they can accommodate comparatively large volumes of the reactants and thereby can provide the residence time that is required to obtain the degree of polymer conversion that is desired at a particular stage in the loop reactor. However, as the reactants polymerize in the static mixer their molecular weight and melt viscosity increase. This can make the polymerized material more difficult to circulate through the loop reactor. In one embodiment, it has been found desirable to replace one (or more) of the static mixers in the loop reactor with a dynamic mixer such as a twin screw extruder or a planetary roller extruder (PRE). While a dynamic mixer such as a PRE will often have a smaller residence volume than a static mixer, it imparts shear thinning to the reaction mixture that reduces the melt viscosity of the reaction mixture thereby making it easier to move the polymerized material through the loop reactor. A dynamic mixer such as a PRE is also advantageous because it can efficiently mix the reactants and reduce localized accumulations of unreacted monomer in the reaction mass.

Accordingly, another process for preparing a polymeric material using a loop reactor may include the steps of (a) introducing a feed stock containing at least one monomer and at least one activatable initiator into a dynamic mixer such as an extruder and, more particularly, a planetary roller extruder located in a reaction loop, (b) introducing partially polymerized intermediate into the dynamic mixer to form a polymerizable mixture, (c) heating the mixture from step (b) to at least the activation temperature of the initiator to polymerize the monomer in the feed stock with the polymerized intermediate, (d) recirculating a first portion of the product of step (c) in the reactor, (e) directing the remaining portion of the product of step (c) into a stream for removal from the loop reactor, and (f) mixing the recirculating portion of the product from step (c) with additional feed stock.

In a further embodiment, step (d) additionally includes the step of (g) cooling the product of step (c) to below the activation temperature of the initiator. In a further embodiment, the process additionally includes the optional step of (h) subjecting the remaining portion of the partially polymerized material to an additional reaction to further polymerize the polymerized material prior to removal in step (e). In a further embodiment, the process additionally includes the step of (i) removing unreacted monomer from the remaining portion through drying, devolatilization, or the like prior to removal. In a further embodiment, the process additionally includes the step of (j) applying the polymerized product to a web-form material.

In another aspect of the invention, a combination of a recirculation loop reactor and a dynamic mixer such as an extruder and, more particularly, a planetary roller extruder is used in a process for preparing polymeric material that may include the steps of (a) introducing a feed stock of at least one monomer and at least one initiator into a loop reactor having a partially polymerized intermediate recirculating there through to form a polymerizable mixture, (b) heating the mixture from step (a) to at least the activation temperature of the initiator to polymerize the monomer with the partially polymerized intermediate, (c) circulating the polymerized intermediate from step (b) through the reactor while cooling it to a temperature below the activation temperature of the initiator, (d) mixing the cooled recirculating polymerized intermediate from step (c) with additional feed stock to further polymerize the monomer with the intermediate, (e) removing a portion of the further polymerized material from the loop reactor, and (f) subjecting the further polymerized polymeric material to an additional reaction in a planetary roller extruder to reduce unreacted monomer. In a further embodiment, the process additionally includes the step of (g) removing unreacted monomer through drying, devolatilization, or the like. In a further embodiment, the process additionally includes the step of (h) applying the polymerized product to a web-form material.

In another aspect, a self-adhesive composition that is the reaction product of at least one alkyl acrylate monomer having at least one free radical polymerization moiety and a heat-activated initiator is manufactured according to the aforementioned process.

In another aspect, the self-adhesive composition may be applied to a web-formed material using an application unit such as a slot-die applicator unit and subsequently may be crosslinked.

| Index | Description | Index | Description |
|-------|-------------|-------|-------------|
| ML | Main line | FIC | Flow Indicator Control |
| AL | Additive line | PIC | Pressure Indicator Control |
| AA | Valve | LIC | Level Indicator Control |
| AT | Filter | PSA | Pressure Probe |
| CF | Flow meter | TSA | Temperature Probe |
| SI | Safety valve | HTS | N/A part number |
| SM | Static mixer | CT | N/A part number |
| CP | N/A part number | HL | Heated Line |
| FU | Frequency converter | M | Motor |
| TCU | Temperature control unit | FT | Flow Transmitter |
| TIC | Temperature Indicator Control | AP | Pump |

Figure 3:
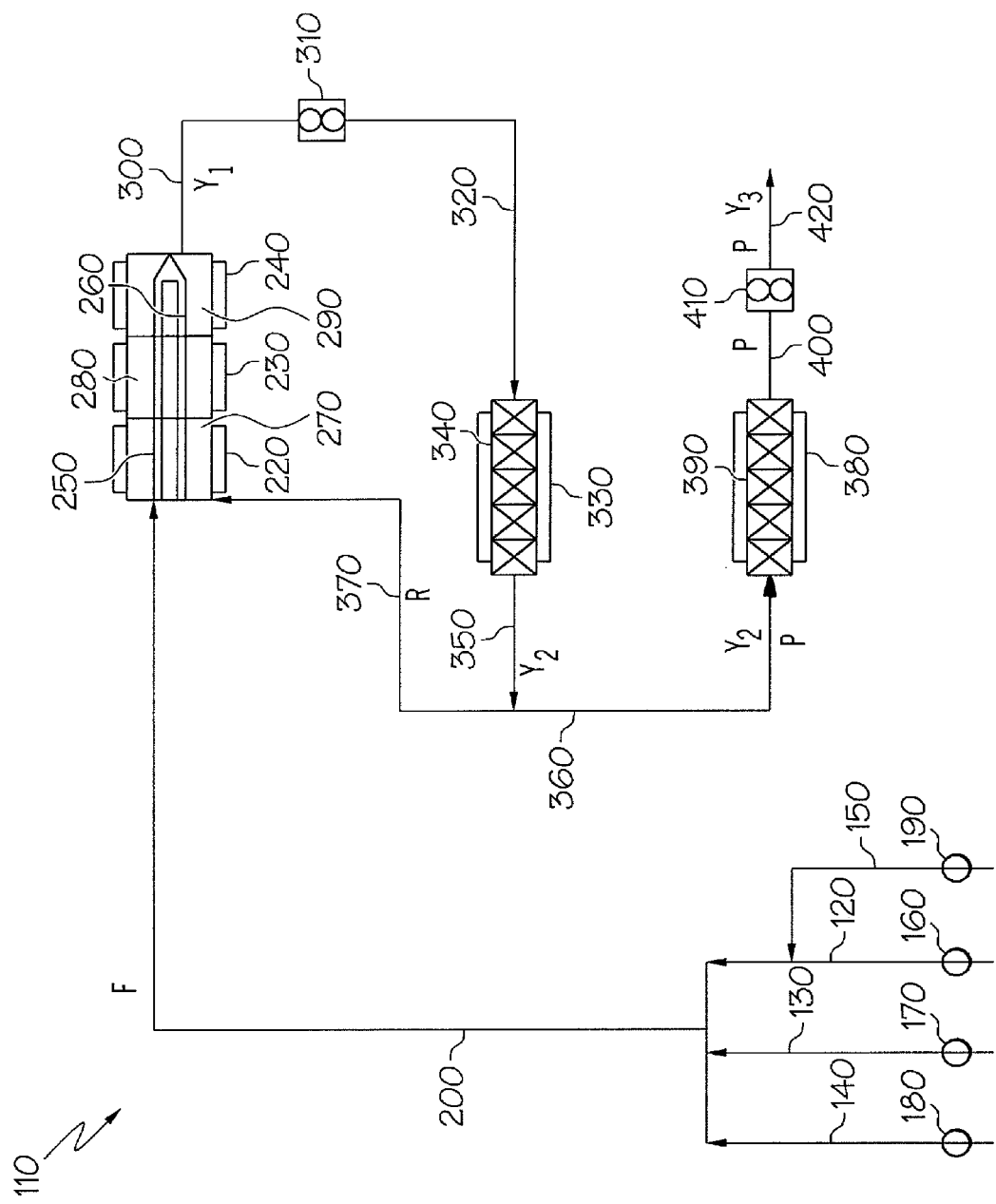

FIG. 3 is a schematic illustration of one aspect of the disclosed combined recirculation tubular loop reactor and planetary roller extruder process.

Figure 4:
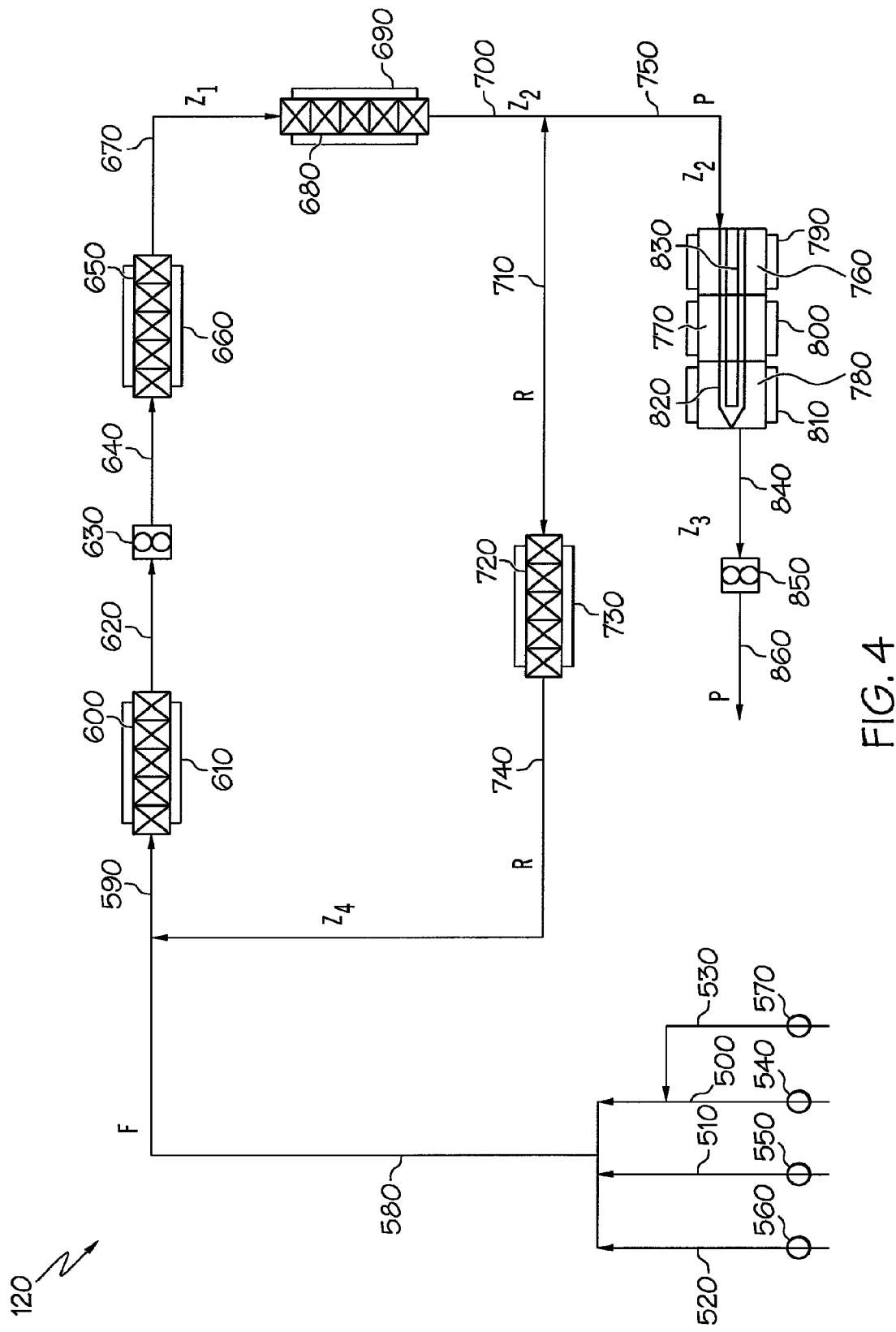

FIG. 4 is a schematic illustration of another aspect of the disclosed combined recirculation tubular loop reactor and planetary roller extruder process.

DETAILED DESCRIPTION OF INVENTION

Figure 1:
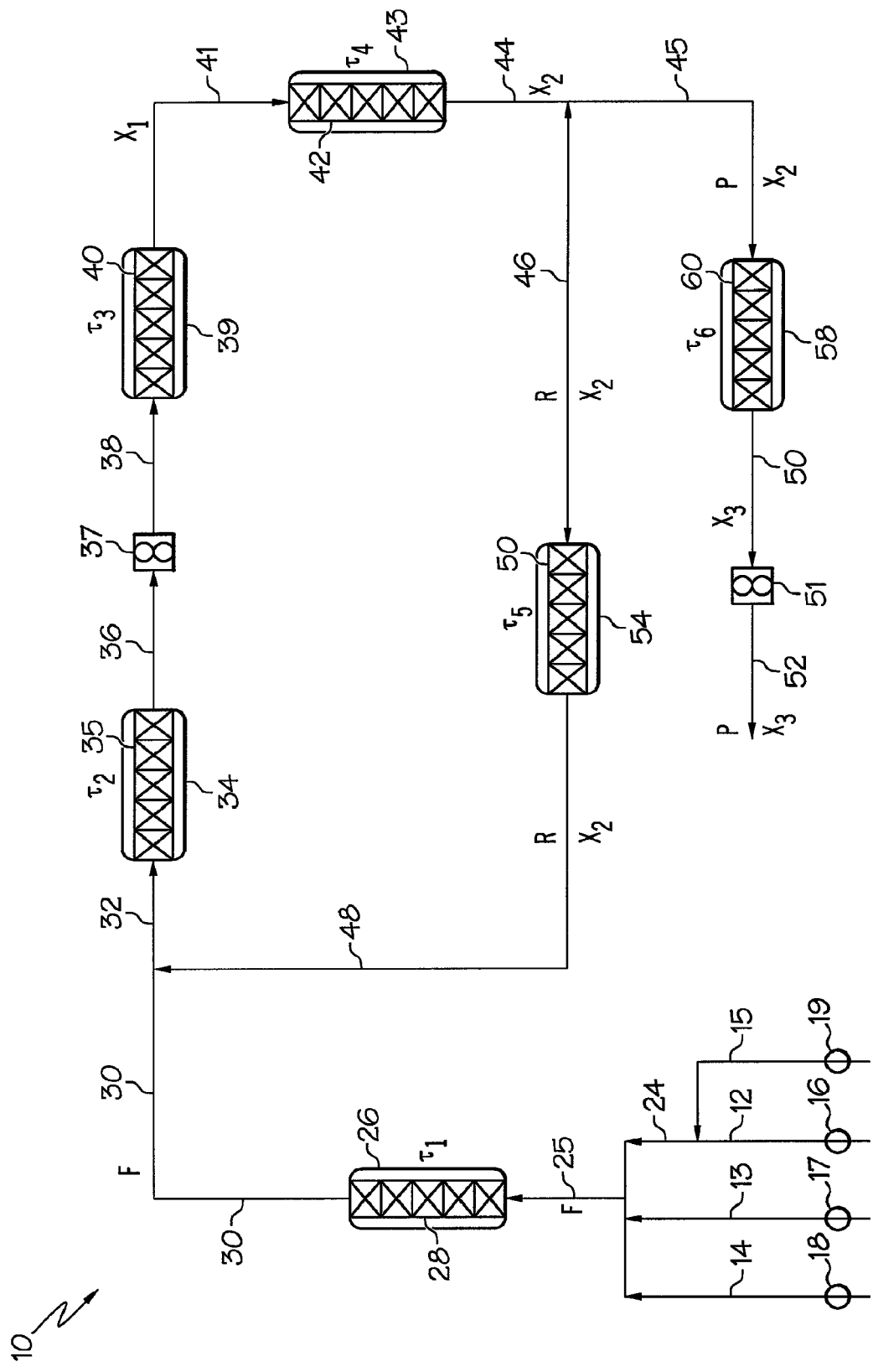
FIG. 1 is a schematic illustration of one aspect of the disclosed recirculation tubular reactor process.

In one aspect, an adhesive product (e.g., an acrylate pressure sensitive adhesive) may be prepared according to the recirculation tubular reactor process 10 shown in FIG. 1. The primary raw materials may include a first monomer 12 (e.g., butyl acrylate or "BA"), a second monomer 13 (e.g., vinyl acetate or "VA"), a third monomer 14 (e.g., acrylic acid or "AA") and a thermal initiator 15 (e.g., azo-diisobutyronitrile or "AIBN"). Dosage of the monomers 12, 13, 14 and the initiator 15 may be regulated with pumps 16, 17, 18, 19, respectively, which may be double diaphragm pumps or the like. The flowrate of each pump 16, 17, 18, 19 may be controlled, for example, by controlling the frequency and/or the stroke-length of the piston (not shown) in each pump 16, 17, 18, 19.

Those skilled in the art will appreciate that the quantity, quality and type of monomer and initiator used is dependent upon the desired end product and that the process of FIG. 1, which illustrates the use of three monomers 12, 13, 14 and one initiator 15, is only an example. Additional initiators may be used. One or more monomers may be used. It will also be apparent that the monomer(s) and initiator(s) do not need to be mixed off-loop in the feed stream 25 but they may be introduced to the loop as individual feeds and mixed in a mixer in the loop.

Monomers useful according to the disclosed process 10 may include, but are not limited to, alkyl acrylate monomers or mixtures of alkyl acrylate monomer having, for example, an alkyl group with from about 2 to about 20 and, preferably, 4 to 10 carbon atoms. Preferred alkyl acrylate monomers may include 2-ethylhexyl acrylate, butyl acrylate (BA), isooctyl acrylate, isodecyl acrylate and any other monomers or mixtures thereof, known to those skilled in the art. Di-vinyl monomers may be used to increase the molecular weight and the internal strength of the polymer backbone and may be employed in one aspect of the process 10. In one aspect, di-vinyl monomers may be used in amounts up to about 11 percent by weight of the acrylic polymer. Suitable vinylic monomers employed in the practice of certain embodiments include styrene, acrylic acid (AA), alpha methyl styrene, tetraethylene glycol diacrylate, hydroxyethyl methacrylate, methylmethacrylate, ethylacrylate, methylacrylate, propylacrylates, propylmethacrylates, hexylacrylates, hexylmethacrylates and vinyl acetate (VA).

In one aspect, suitable polymerization initiators 15 useful according to the disclosed process 10 may be any compound or composition or combination of compounds and/or compositions that release free radicals when heated to an activation or decomposition temperature. For example, useful initiators 15 may include organic peroxides and azo compounds such as, but not limited to, lauroyl peroxide, tertiarybutyl peroxy (2-ethylhexanoate), benzoyl peroxide, 1,1-bis(tertiarybutylperoxy)-3,3,5-trimethylcyclohexane, azo-diisobutyronitrile and azobis-2-methylbutyronitrile. In another aspect, the initiator 15 may be any material or process that provides free radicals, such as light (e.g., UV light), radiation, chemical interactions or the like.

In one aspect, the initiators 15 may be used in amounts varying from about 0.002 to about 2.0 percent by weight and, more particularly, between about 0.01 and about 1.0 percent by weight, based upon the total weight of the monomers.

Polymerization reaction temperatures may be selected based upon the type of monomer material used, the decomposition temperature of the initiator material and/or the desired polymer product desired. For example, a polymerization reaction may be carried out at a temperature of about 100 to about 140° C. when initiator 15 is AIBN.

Referring again to FIG. 1, the monomers 12, 13, 14 and the initiator 15 may be thoroughly mixed in a first static mixer 28. In one aspect, the initiator 15 may be initially mixed with the first monomer 12 to form a blended mixture 24 prior to entering the bulk feed stream 25 (also designated F in FIG. 1 and having units of weight per time) and flowing into the mixer 28. In one modification, the initiator 15 may be premixed with the monomer having the highest through-put, thereby facilitating the distribution of the initiator.

Static mixer 28 may be characterized as having sufficient residence time $\tau_1$ to thoroughly mix the monomer 12, 13, 14 and initiator 15 and to generate an output stream 30. It should be noted that the static mixer 28 may be fitted with a jacket 26 or other heat transfer device to provide heating/cooling, should it be desired to raise or lower the temperature of the feed stock as it passes through mixer 28. The tubular reactor residence time, generally denoted $\tau$, may be defined as the ratio of the reactor vessel free-volume to the volumetric feed rate. While static mixer 28 is shown in FIG. 1 as being off-loop, those skilled in the art will appreciate that the mixer 28 could be moved into the loop itself.

Based upon an overall material balance of the process 10 illustrated in FIG. 1, the polymer product output P may be equal to the flowrate F of the monomer(s) and initiator(s). Feed stock stream 30 has a flowrate F and may be combined with a recirculating polymer stream 48 having a flowrate R to form a polymer/monomer/initiator mixed stream 32. The polymer/monomer/initiator mixed stream 32 may be fed to a static mixer 35, which may be characterized as having a sufficient residence time $\tau_2$ to thoroughly mix the stream 32. The output of vessel 35 may be output stream 36. Static mixer 35 may be fitted with a jacket 34 to provide heating and/or cooling if necessary.

The recirculation flowrate R may be defined as the volume of fluid returned to the reactor loop (i.e., the point where streams 30 and 48 merge). The recycle ratio RR may be defined as the ratio of R to P.

A gear pump 37 may be fluidly connected in the flow channel between the stream 36 of static mixer 35 and the inlet stream 38 to a static mixer 40, which may be characterized as having sufficient residence time $\tau_3$ to mix/react stream 38 to form stream 41. The volumetric flowrate of gear pump 37 may be the sum of F and R.

In one aspect, the stream 38 may be heated in the mixer 40 to a temperature above the activation temperature of the initiator, thereby initiating a free-radical polymerization reaction, wherein the monomer is at least partially converted to a polymer (i.e., stream 41 may have a conversion $X_1$). The mixer 40 may include a jacket 39 for providing a heating/cooling means for stream 38, 41.

The fractional conversion of liquid monomer into adhesive polymer, generally denoted $X_n$, may be calculated as follows:

$$X_n = 1 - (C_n/C_o)$$

wherein $X_n$ has a numerical value between 0 and 1, inclusive. For example, $X_1$ may be calculated as follows:

$$X_1 = 1 - (C_1/C_o)$$

wherein $C_o$ is the concentration of reactant monomer in stream 32 and $C_1$ is the concentration of reactant monomer in stream 41. In a similar manner $X_2$ may be calculated as follows:

$$X_2 = 1 - (C_2/C_o)$$

wherein $C_2$ is the concentration of reactant monomer in stream 44. Likewise, $X_3$ may be calculated as follows:

$$X_3 = 1 - (C_3/C_o)$$

where $C_3$ is the concentration of reactant monomer in stream 50.

For example, when the process 10 is used to react BA, VA and AA with AIBN to form an acrylate PSA, conversion $X_1$ may be about 0.8, conversion $X_2$ may be 0.95 and conversion $X_3$ may be 0.99, though those skilled in the art will appreciate that the actual conversions may be dependent upon the flowrates F, R, P and the sizes of the vessels 28, 35, 40, 42, 50, 60, among other factors.

The stream 41 from static mixer 40 may flow into static mixer 42 which may be characterized as having sufficient residence time $\tau_4$ to continue converting monomer into polymer to obtain a conversion $X_2$. Vessel 42 may include a jacket 43 to provide heating/cooling means to stream 41. Stream 44 may be characterized by a flowrate consisting of the sum of F and R and may be split into stream 45 having a flowrate P and stream 46 having a flowrate R. The volumetric split may be regulated by a gear pump 51, which may be fluidly connected in the flow channel between streams 50 and 52. The volumetric flowrate of gear pump 51 may be characterized as P. Alternatively, or in combination with pump 51, a three-way valve (not shown) may be located at the point where stream 45 diverges from stream 46 to regulate the recirculation flowrate R. Stream 45 may enter a static mixer 60 to further react the monomer to a conversion $X_3$. Vessel 60 may be characterized as having a sufficient residence time $\tau_6$ and heating/cooling capabilities (e.g., jacket 58) to convert stream 45 having a flowrate P at a conversion $X_2$ into stream 50 having a flowrate P at a conversion $X_3$.

The tubular reactor loop process cycle may be completed by stream 46 entering static mixer 50 at a flowrate R, which may be characterized as having sufficient residence time $\tau_5$ to cool the mass below the initiation temperature. Exit stream 48 may exit the vessel 50 while generally retaining the conversion $X_2$. Static mixer/cooler 50 may include a jacket 54 to facilitate the cooling of stream 46.

In one aspect, the total loop residence time may be the sum of $\tau_2, \tau_3, \tau_4$ and $\tau_5$. For example, the total loop residence time may be about 20 minutes such that the polymer mixture recirculates in the loop about 3 times per hour. In another aspect, gear pumps 37, 51 may be adjusted such that the total loop residence time provides about 1 to about 4 recirculations per hour. At this point, those skilled in the art will appreciate that the total residence time may be selected to obtain the desired product depending upon the type of end polymer desired and the monomers and initiators used.

In one aspect, the product stream 52 (i.e., the final product) may be applied to a web-formed material using an application unit such as a slot-die applicator. However, those skilled in the art will appreciate that the recirculation tubular reactor process 10 described herein may be used to produce a wide variety of polymeric materials for a variety of different uses. For example, the process 10 described herein may be used to produce release coatings, primer coatings, non-PSA adhesives, sealants, caulks, acrylic hybrid PSAs and non-PSA coatings, such as urethane acrylics, epoxy acrylics, styrene acrylics and the like.

Static mixers, such as continuous tubular reactors, may be characterized as having reactants introduced and products withdrawn simultaneously in a continuous manner. The reactants may enter at one end of the reactor and the products may exit at the other end, with a continuous variation in the composition of the reacting mixture in between. Heat transfer to and/or from the tubular reactor may be accomplished with jackets or a shell and tube design. Fluid media may be forced to mix themselves through a progression of divisions and recombinations within a static mixer. As a static mixer has no moving parts, the maintenance and operating costs may be significantly reduced. The energy for mixing may be delivered by the pumps 37, 51 that facilitate flow through the vessels. Tubular reactors may be characterized by the fact that the flow of fluid through the reactor is orderly with no element of fluid overtaking or mixing with any other element ahead or behind.

The gear pumps 37, 51 discussed herein may include a housing defining a pump cavity (not shown), a pair of intermeshing toothed gears (not shown) rotatably disposed within the pump cavity, each gear having a mounting shaft (not shown) extending axially therefrom, and a bearing means (not shown) for rotatably supporting the gear shafts. The bearing means may include a radial face disposed in facing relation to the gears and a pair of axial openings for rotatably receiving the gear shafts. The gear pumps 37, 51 may be driven externally by rotating the drive shaft of the pumps 37, 51 with a motor (not shown). As materials passes through the gear pumps 37, 51, the rotation imparted by or on the gears may be in direct proportion to the amount of material passing through the gears. Thus, the gears may act as precise devices to meter the quantity of plastic flowing in the channel. The volume of the gear mechanisms may be varied either by varying the size of the gears or the axial thickness of the gears.

The vessels 28, 35, 40, 42, 50, 60 described herein may have dual purposes, namely (1) elevating and/or decreasing the temperature and (2) mixing the fluid passing therethrough. The vessels 28, 35, 40, 42, 50, 60 may be "residence time reactors" because they may provide the reactants with additional time to reach the activation temperature and may provide additional mixing.

At this point, those skilled in the art will appreciate that more or less vessels 28, 35, 40, 42, 50, 60 may be used according to the process 10. For example, vessels 40, 42 may be separate vessels or may be combined as a single vessel.

For exemplary purposes only, the bulk feed stream 25 may include a BA monomer stream 12 at a flowrate of 6.83 kg/hr, a VA monomer stream 13 at a flowrate of 0.6 kg/hr, an AA monomer stream at a flowrate of 68 grams/hr and an AIBN initiator 15 at a flowrate of 2 grams/hr. The product stream 52 may be an acrylate PSA at a flowrate P of 7.5 kg/hr.

Figure 2:
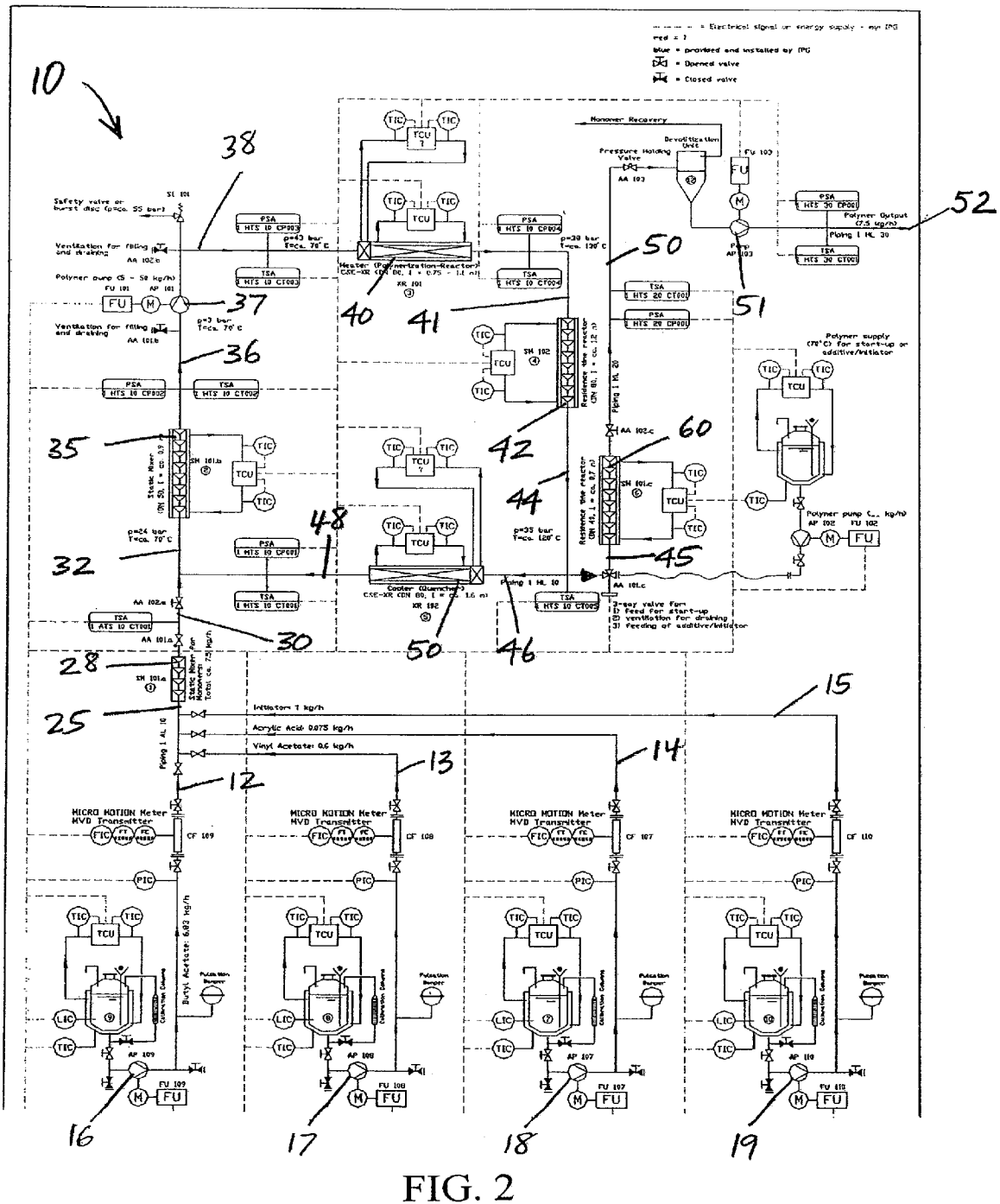
FIG. 2 is a control diagram for the process of FIG. 1. A legend for FIG. 2 is provided below.

The static mixer/heater 35 may mix the low viscosity monomers/initiator with the high viscosity polymer. At 70° C., the initiator (AIBN) and monomers are present together but they do not react. Recirculation stream 48 may be 0.042 m$^3$/hr, 900 kg/m$^3$, 700 Pas; Stream 30 may be 0.00833 m$^3$/hr, 900 kg/m$^3$, 0.01 Pas; Stream 32 may be 0.05 m$^3$/hr, 900 kg/m$^3$, 583 Pas. Static mixer/heater 35 may be CSE-X/8, DN 49.5, 18 elements, $\Delta$p=ca. 21 bar, shear rate 10.5 s$^{-1}$, residence time 104 s, length approximately 900 mm, as shown in FIG. 2.

In one aspect, the gear pump 37 may be capable of pumping about 50 kg/hr of polymer with about 1,000 Pas viscosity against a pressure of about 50 bar. The flow may be controlled by the accuracy of the pump 37 (a flow meter may be optional). In one aspect, the recirculation rate R may be about 1 to about 5 times the feed-rate F.

The homogenized mixture 38 of monomer/polymer/initiator may be heated in the mixer/heat exchanger 40. By increasing the temperature from about 70° C. to about 120° C. the polymerization reaction may be induced. The exothermic heat generated may be partly absorbed by the bulk polymer and the temperature rise due to the reaction may, for example, be about 20 to about 40° C. Heating may be performed with Marlotherm® L heat transfer fluid supplied to the reactor jacket 39 (e.g., at about 120° C.). Once the reaction starts the reactor jacket 39 may operate as a cooler, thereby keeping the temperature under control. Mixture data (stream 41) may be 0.005 m$^3$/hr, 900 kg/m$^3$, 700 Pas, Cp (heat capacity) of 2,300 J/kg/° K, $\lambda$ (latent heat) of 0.15 W/m/° K. Mixer/heat exchanger 40 may be a CSE-XR, DN 80, 8 elements, $\Delta$p=ca. 5 bar, shear rate 4 s$^{-1}$, residence time 170 s, length approximately 750-1,100 mm as shown in FIG. 2.

Marlotherm® LH is a high-performance synthetic, organic heat-transfer medium for use in the liquid phase in closed forced circulation unpressurized heat transfer systems at working temperatures from about 0° to about 280° C. The Marlotherm® heat transfer fluid is supplied by Sasol Olefins & Surfactants (Marl, Germany). A reaction temperature of about 120° C. may be suitably selected for the AIBN initiator, although alternatively, different thermal initiators or mixtures of thermal initiators may require a different reaction temperature.

Vessel 42 may be a double jacketed mixer and may be capable of providing additional residence time and mixing performance in order to increase the yield and the product quality. The polymer streams 41, 44 may be kept at a constant temperature (e.g., 120° C.). Mixture data (stream 44) may be characterized as 0.05 m$^3$/hr, 900 kg/m$^3$, 700 Pas. Mixer/heat exchanger 42 may be characterized as CSE-X/4, DN 80, 15 elements, $\Delta$p=ca. 3 bar, shear rate 1.6 s$^{-1}$, residence time 390 s, length approximately 1,200 mm, as illustrated in FIG. 2.

The monomer/polymer/initiator mixture may be cooled in the recirculation loop by vessel 50 from about 120° C. down to about 70° C., thereby reducing or preventing further polymerization. The cooling of vessel 50 may be performed with Marlotherm® L supplied to the jacket 54 of the vessel 50 (e.g., at about 60° C.). Mixture data (stream 48) may be 0.005 m$^3$/hr, 900 kg/m$^3$, 700 Pas, Cp of 2,300 J/kg/° K, $\lambda$ of 0.15 W/m/° K. Mixer/heat exchanger 50 maybe a CSE-XR, DN 80, 18 elements, $\Delta$p=ca. 11 bar, shear rate 4 s$^{-1}$, residence time 390 s, length approximately 1,600 mm, as illustrated in FIG. 2.

Vessel 60 may be a double jacketed static mixer and may provide additional residence time and mixing, thereby increasing the conversion from $X_2$ to $X_3$. The 7.5 kg/hr flowrate P may be regulated by the gear pump 51. Mixture data (stream 52) may be characterized as 0.00833 m$^3$/hr, 900 kg/m$^3$, 700 Pas. Mixer/heat exchanger 60 may be characterized as, CSE-X/4, DN 40, 15 elements, $\Delta$p=ca. 6 bar, shear rate 2.7 s$^{-1}$, residence time 265 s, length approximately 700 mm, as shown in FIG. 2.

Flowrate, temperature, pressure, vessel level, melt viscosity and electrical power sensor readouts and various control systems may be provided to assist the process operator with process control, as illustrated in FIG. 2. Other process control features may include pressure-resistant piping, pressure-resistant valving, process start-up features, process shut-down features, 3-way valves, polymer content monitoring and residual monomer monitoring and the like.

In one aspect, a polymeric product (e.g., an acrylate pressure sensitive adhesive (PSA)) may be prepared according to the process 110 shown in FIG. 3 using a planetary roller extruder. While a PRE is illustrated in this figure, other dynamic mixers or extruders could be substituted for or used in combination with the PRE. The primary raw materials may include a first monomer 120 (e.g., butyl acrylate or "BA"), a second monomer 130 (e.g., vinyl acetate or "VA"), a third monomer 140 (e.g., acrylic acid or "AA") and a thermal initiator 150 (e.g., azo-diisobutyronitrile or "AIBN"). Dosage of the monomers 120, 130, 140 and a liquid initiator or solid initiator in solution 150, may be performed and controlled with pumps 160, 170, 180, 190, respectively, which may be double diaphragm pumps or the like. The flowrate of each pump 160, 170, 180, 190 may be controlled, for example, by controlling the frequency and/or the stroke-length in each pump 160, 170, 180, 190.

Those skilled in the art will appreciate that the quantity, quality and type of monomer and initiator used is dependent upon the desired end product and that the process of FIG. 3, which illustrates the use of three monomers 120, 130, 140 and one initiator 150, is only an example. More or fewer monomers and initiators may be used depending on the product.

Monomers 120, 130, 140 and polymerization initiators 150 useful according to the disclosed process 110 may include those listed previously for disclosed process 10.

In one aspect, the initiators 150 may be used in amounts varying from about 0.002 to about 2.0 percent by weight and, more particularly, between about 0.01 and about 1.0 percent by weight, based upon the total weight of the monomer feed stock.

Referring to FIG. 3, a reactor loop, generally designated 110, is used in one aspect to prepare an acrylate polymeric product. The monomers 120, 130, 140 and a liquid initiator or solid initiator in solution 150, are provided by pumps 160, 170, 180 and 190, respectively to form a bulk feed stream 200 (having a flow rate F in FIG. 3).

The feed stream 200 is carried into the first planetary roller barrel 270 and combined with a recycled polymer stream 370 (having a recirculation flowrate R in FIG. 3), and heated to about 25 to about 240° C. to initiate the free-radical reaction process. In this embodiment, the mixture 300 is fed into a second planetary roller extruder barrel 280 and a third planetary roller barrel 290, where a preset residence time is provided to minimize the residual monomer content of the finished polymer stream 300. Individual monomers 120, 130, 140 as well as the feed stream 200 can be injected into the PRE anywhere along the length but most preferably using injection valves inserted into a spray ring before the first PRE barrel. Alternatively, it could also be injection valves inserted into any dispersion rings before and after any PRE barrels or a side port directly into a barrel or other internal and external delivery mechanisms. The recycle polymer stream 370 can be introduced into the PRE anywhere along its length but most preferably using a recirculation port in the side of a PRE barrel. Alternatively, it could also be introduced at any injection valves specially designed to handle such viscosity material at the same rings as monomer additions or other internal or external delivery mechanisms. To those skilled in the art, it is understood that the use of a three barrel PRE is only an example and barrels may be added or subtracted depending on the product desired. Temperature control is maintained within zones 270, 280, 290 for example by heating/cooling medium through the barrel walls 220, 230, 240 as well as through a central bore 250 in the central spindle 260. In one embodiment, the polymer process temperature is maintained below 240° C. (e.g., the minimum degradation temperature for acrylic polymers and copolymers).

The fractional conversion of liquid monomer into adhesive polymer, generally denoted $Y_n$, in process 110 may be calculated as follows:

$$Y_n = 1 - (C'_n/C'_o)$$

wherein $Y_n$ has a numerical value between 0 and 1, inclusive. For example, $Y_1$ may be calculated as follows:

$$Y_1 = 1 - (C'_1/C'_o)$$

wherein $C'_o$ is the concentration of reactant monomer in combined streams 200 and 370 and $C'_1$ is the concentration of reactant monomer in stream 300. In a similar manner $Y_2$ may be calculated as follows:

$$Y_2 = 1 - (C'_2/C'_o)$$

wherein $C'_2$ is the concentration of reactant monomer in stream 350. Likewise, $Y_3$ may be calculated as follows:

$$Y_3 = 1 - (C'_3/C_o)$$

where $C'_3$ is the concentration of reactant monomer in stream 400.

Stream 300 may have a conversion $Y_1$, and a flowrate characterized as the sum of F, the flow from the feed materials, and R, the recycled feed. A gear pump 310 is fluidly connected in the flow channel between the stream 300 and the stream 320 to a static mixer 340. The volumetric flowrate of pump 310 may be but is not necessarily the sum of F and R. Those skilled in the art will recognize that as a result of the shear thinning that occurs in the PRE and other volumetric changes that can accompany the mixing of reactants, as will as compressive effects that can be accommodate within the loop reactor, the flowrate of pump 310 can vary. In general, the purpose of the pump 310 is to minimize pulsations in flowrate. The static mixer 340 may include a jacket 330 and/or other heat exchange device for providing a heating/cooling means for stream 320.

Stream 350 may have a conversion $Y_2$ and may be split into stream 360 having a flowrate P and stream 370 having a flowrate R. The volumetric split may be regulated by a pump 410, which may be fluidly connected in the flow channel between streams 400 and 420. The volumetric flowrate of pump 410 may be characterized as P. Stream 360 may enter a static mixer 390 to further react the monomer to a conversion $Y_3$. Static mixer 390 may have heating/cooling capabilities (e.g., jacket 380) to convert stream 360 having a flowrate P at a conversion $Y_2$ into stream 400 having a flowrate P at a conversion $Y_3$.

Thus by incorporating at least one PRE in the loop reactor, the reactor and process defined earlier is made more versatile. If the only mixers are static mixers, then mixing is dependent upon a threshold linear velocity of the polymeric material, above which is required to impart sufficient shear for effective mixing. With a dynamic mixer, mixing efficiency is largely independent of linear velocity of the polymeric material. Thus the option of using a PRE in the loop reactor increases mixing and heat exchange versatility of the overall reactor system.

Referring to FIG. 4, an alternative process, generally designated 120, is used in one aspect to prepare an acrylate polymeric product. The monomers 500, 510, 520 and a liquid initiator or solid initiator in solution 530, are provided by pumps 540, 550, 560 and 570, respectively to form a bulk feed stream 580 (also designated F in FIG. 4).

In one embodiment, the stream 580 may have a flowrate F and may be combined with a recirculation polymer stream 740 having a flowrate R to form a polymer/monomer/initiator mixture stream 590. The polymer/monomer/initiator mixture stream 590 may be fed to a static mixer 600, which is designed to thoroughly mix the stream 590. The output of static mixer 600 may be output stream 620. Static mixer 600 may be fitted with a jacket 610 to provide heating and/or cooling if necessary. A gear pump 630 may be fluidly connected in the flow channel between the stream 620 of static mixer 600 and the inlet stream 640 to a static mixer 650, which is designed to mix/react stream 640 to form stream 670. The volumetric flowrate of pump 37 may approximate the sum of F and R, but as mentioned earlier, the system will accommodate variations in flow.

The fractional conversion of liquid monomer into adhesive polymer, generally denoted $Z_n$, in process 120 may be calculated as follows:

$$Z_n = 1 - (C''_n/C''_o)$$

wherein $Z_n$ has a numerical value between 0 and 1, inclusive. For example, $Z_1$ may be calculated as follows:

$$Z_1 = 1 - (C''_1/C''_o)$$

wherein $C''_o$ is the concentration of reactant monomer in stream 590 and $C''_1$ is the concentration of reactant monomer in stream 670. In a similar manner $Z_2$ may be calculated as follows:

$$Z_2 = 1 - (C''_2/C''_o)$$

wherein $C''_2$ is the concentration of reactant monomer in stream 700. Likewise, $Z_3$ may be calculated as follows:

$$Z_3 = 1 - (C''_3/C''_o)$$

where $C''_3$ is the concentration of reactant monomer in stream 840.

Analogous to the earlier description, the inlet stream 640 may be heated in the static mixer 650 to a temperature above the activation temperature of the initiator, thereby initiating a free-radical polymerization reaction, wherein the monomer is at least partially converted to a polymer (i.e., stream 670 may have a conversion $Z_1$). The static mixer 650 may include a jacket 660 and/or other heat exchange device for providing a heating/cooling means for stream 640, 670.

The exiting stream 670 from static mixer 650 may flow into static mixer 680 which may be characterized as having sufficient residence time to continue converting monomer into polymer to obtain a conversion $Z_2$ in stream 700. Static mixer 680 may include a jacket 690 and/or other heat exchange device to provide heating/cooling means to streams 670, 700. Stream 700 may be split into stream 750 having a product flowrate P and recirculated stream 710 having a flowrate R. The amount of product removed from the reactor loop 120 may be regulated by a pump 850, which may be fluidly connected in the flow channel between streams 840 and 860. The volumetric flowrate of pump 850 may be characterized as P. Stream 710 may enter a static mixer 720 to further react the monomer. Static mixer 720 may be characterized as having a sufficient residence time and cooling capabilities (e.g., jacket 730) to convert stream 710 having a flowrate R into stream 740 at a temperature below the activation temperature and possible additional conversion $Z_4$ (i.e., where $C''_4$ is the concentration of reactant monomer in stream 740).

Stream 750 having a conversion $Z_2$ is carried into the first planetary roller barrel 760 and heated to about 25 to about 240° C. to continue the free-radical reaction process. The mixture is carried into a second planetary roller barrel 770 and a third planetary roller barrel 780, where a preset residence time is provided to minimize the residual monomer content of the finished polymer stream 840. Accurate temperature control can be maintained within barrels 760, 770, 780 by conducting heating/cooling medium through the barrel walls 790, 800, 810, respectively and close to the intermeshing surfaces, as well as through a central bore 830 in the central spindle 820. The polymer process temperature is maintained below the polymeric materials degradation temperature (i.e., 240° C. for butyl acrylic polymers). Planetary roller barrels 760, 770, 780 convert stream 750 having a flowrate P at a conversion $Z_2$ into stream 840 having a flowrate P at a conversion $Z_3$.

In one aspect, the product streams 52, 420 and 860 from the processes 10, 110, 120, respectively, may be applied to a web-formed material using an application unit such as a slot-die applicator or other application and doctoring methods.

Those skilled in the art will appreciate that the processes 10, 110, 120 described herein may be used to produce a wide variety of polymeric materials for a variety of different uses, for example release coatings, primer coatings, adhesives, PSA and non-PSA, sealants, caulks, and architectural coatings. Moreover, these adhesives and coatings can be polymerized with a wide variety of chemistries. Specifically chemistries such as, but not limited to, acrylic monomers, polyols, isocyanates, vinyl materials, epoxies and the like.

In one embodiment, the polymeric composition produced according to processes 10, 110, 120 may be crosslinked with the aid of electron beams or UV energy in a manner known in the art. For example, crosslinking the polymeric material using UV energy may require the addition of appropriate UV promoters (e.g., photoinitiators, such as peroxides). If desired, the UV promoters or actinic radiation promoters may be added by way of the recirculated tubular reactor process without departing from the scope of this disclosure.

In the event that additional tack and/or adhesion is required, resins, oils and/or other additives may be added to the reactants and/or the final product. In the event that color or other properties need to be modified; pigments, dyes, fillers, anti-degradants and/or other additives may be added to the reactants and/or the final product.

Typical tackifying resins may include, but are not limited to partially or fully hydrogenated wood, gum or tall oil rosins, esterified wood, gum or tall oil rosins, alpha and beta pinene resins and polyterpene resins. The resins may be introduced in solid, liquid, i.e. including, but not limited to solutions and dispersions and/or molten form. Typical anti-degradants include antioxidants, ultraviolet absorbers and ultraviolet stabilizers. Typical crosslinking agents may include peroxides, ionic, thermally-activated resins, isocyanates, UV, and/or EB activated curing agents. Typical colorants may include titanium dioxide and other various metal pigments. In the event that the use of solvents is desired, typical solvents may include liquid carboxylates such as ethyl acetate and n-butyl acetate, ketones such as acetone, dimethyl ketone and cyclohexanones, aromatic hydrocarbons such as benzene, toluene, and the xylenes, liquid aliphatic and cyclo-aliphatic hydrocarbons such as petroleum fractions having boiling points of about 50 and 150° C. and in particular about 60 and 100° C., cyclohexane, and others such as dioxane, tetrahydrofuran and di-t-butyl ethers or mixtures thereof. Particularly useful solvents for the polymeric composition of this disclosure may include ethyl acetate, cyclohexane, and mixtures of acetone with petroleum ether (e.g., having a boiling point of about 60 to about 95° C.).

The use of a slot-die for coating polymeric materials onto web-form material may have particular advantages over the traditional coating processes, e.g., roll-over-roll, reverse-roll, knife-over-roll, and the like. Web-form coating speeds, when employing traditional coating processes may be limited to polymeric materials with viscosities of 40,000 cPs or less and are not conducive to high solids polymeric materials. However, the use of slot-die coating technology, particularly when employed in conjunction with high-solids polymeric materials produced by the recirculated tubular reactor process may be of particular interest as application speeds approach and exceed 1,000 meters per minute.

Depending upon the intended use of the web-form product incorporating the polymers produced according to the disclosed process, suitable web-form carrier materials may include any known carriers, with or without appropriate chemical or physical surface pretreatment of the coating side, and with or without appropriate anti-adhesive physical treatment or coating of the reverse side. Representative examples include creped, non-creped and release papers, polyethylene, polypropylene, mono- or biaxially oriented polypropylene films, polyester, PVC, release and other films, as well as foamed materials, wovens, knits and nonwovens in web form made from polyolefins.

Although the disclosed polymerization processes have been shown and described with respect to certain aspect and embodiments, modifications will occur to those skilled in the art upon reading and understanding the specification. The disclosed polymerization process includes all such modifications. In particular, while the discussion herein focuses on a particular embodiment for manufacturing an adhesive, those skilled in the art will recognize that the invention has application to the manufacture of polymeric material in general.

What is claimed is:

1. A process including the steps of:
 a) introducing a feed stock containing at least one monomer and at least one activatable initiator into a recirculating loop reactor having partially polymerized material recirculating therein to form a reaction mixture;

b) heating the reaction mixture to at least the activation temperature of the initiator to produce a polymerized intermediate;

c) recirculating a portion of the polymerized intermediate through the loop reactor while directing a remaining portion of the polymerized intermediate into a removal stream;

d) cooling the recirculating portion of the intermediate to a temperature below the activation temperature of the initiator;

e) mixing the cooled recirculating portion of the intermediate with the feed stock; and f) subjecting the remaining portion of the polymerized intermediate to further reaction to form polymerized product.

2. The process of claim 1 wherein the polymerized product is a self-adhesive composition which comprises the polymerization reaction product of at least one alkyl acrylate monomer.

3. The process of claim 1 wherein the reaction loop includes a plurality of static mixers at least one of those static mixers having heat exchange capabilities.

4. The process of claim 1 wherein the residence time of the monomer in the loop reactor is about 1 to about 5 recirculations per hour.

5. The process of claim 1 wherein amount of the recirculating portion and the remaining portion of the polymerized intermediate is regulated by a gear pump in the removal stream.

6. A process comprising the steps of:

a) introducing a feed stock containing at least one monomer and at least one activatable initiator into a planetary roller extruder located in a recirculating loop reactor having a partially polymerized material circulating therein to form a reaction mixture;

b) heating the reaction mixture from step a) to at least the activation temperature of the initiator to polymerize at least one monomer in the feed stock with the partially polymerized material to form a partially polymerized intermediate;

c) recirculating a portion of the partially polymerized intermediate from step b) through a loop reactor while;

d) directing a remaining portion of the partially polymerized intermediate into a stream for removal from the loop reactor;

e) cooling the recirculating portion of the partially polymerized intermediate from step (c) below the activation temperature of the initiator;

f) mixing a portion of the partially polymerized intermediate from step c) with additional feed stock to further polymerize the monomer and the partially polymerized intermediate; and g) subjecting the remaining portion of the polymerized intermediate to additional reaction to form a polymerized product.

7. The process of claim 6 wherein the polymerized product is a self-adhesive composition which comprises the polymerization reaction product of at least one alkyl acrylate monomer.

8. The process of claim 6 wherein said planetary roller extruder comprises a plurality of compounding sections including a main spindle surrounded by and intermeshed with a plurality of planetary spindles.

9. The process of claim 6 wherein the amount of the recirculating portion and the removed portion is regulated by a gear pump connected in the removal stream.

10. A recirculation loop reactor process including the steps of:

a) introducing a feed stock containing at least one monomer and at least one activatable initiator into a loop reactor having a partially polymerized material recirculating therethrough to form a polymerizable mixture;

b) heating the mixture from step a) to at least the activation temperature of the initiator in the reaction to polymerize the monomer and the partially polymerized material and form a polymerized intermediate;

c) circulating a portion of the polymerized intermediate from step b) through a loop reactor while cooling it to a temperature below the activation temperature of the initiator at a predetermined flow;

d) mixing the cooled circulating material from step c) with additional feed stock to further polymerize the monomer and the polymerized intermediate;

e) directing a remaining portion of the further polymerized intermediate into a stream for removal from the loop reactor; and f) subjecting the remaining portion of the polymerized intermediate to an additional reaction in a planetary roller extruder to reduce the unreacted monomer and form a polymerized product.

11. The process of claim 10 wherein the polymerized product is a self-adhesive composition which comprises the polymerization reaction product of at least one alkyl acrylate monomer.

12. The process of claim 10 wherein said planetary roller extruder comprises a plurality of compounding sections including a main spindle surrounded by and intermeshed with a plurality of planetary spindles.

13. The process of claim 10 wherein the amount of the recirculating portion and the remaining portion is regulated by a gear pump in the removal stream.

14. A polymerization reactor comprising a feed stock containing:

a supply of at least one monomer and at least one initiator, a reactor loop including at least one mixer for mixing the feed stock with a stream of polymerized intermediate recirculating in the reactor loop, and a removal stream for removing polymerized product from the reactor;

wherein the reactor loop includes a junction where the removal stream diverges from the stream of polymerized intermediate and includes a mixer for cooling located in the recirculating stream between the junction and the at least one mixer that is mixing the feed stock with the stream of recirculating polymerized intermediate to cool the polymerized intermediate below an initiation temperature;

wherein the removal stream includes at least a static mixer or a dynamic mixer for further reacting the polymerized intermediate to form a polymer product.

15. The reactor of claim 14 wherein at least one mixer is a static mixer.

16. A polymerization reactor comprising a feed stock containing:

a supply of at least one monomer and at least one initiator, a reactor loop including at least one mixer for mixing the feed stock with a stream of polymerized intermediate recirculating in the reactor loop, and a removal stream for removing polymerized product from the reactor;

wherein the removal stream includes at least a static mixer or a dynamic mixer for further reacting the polymerized intermediate to form a polymer product;

wherein at least one mixer is a dynamic mixer.

17. The reactor of claim 14 wherein at least one mixer is a planetary roller extruder.

18. The reactor of claim 14 wherein the reactor additionally includes a pump in the removal stream for adjusting the amount of intermediate removed from the reactor loop and the amount of intermediate recirculating in the reactor loop.

19. The reactor of claim 16 wherein the reactor includes a dynamic mixer in the removal stream for further reacting the intermediate to form a polymer product.

20. The reactor of claim 19 wherein the reactor additionally includes a planetary roller extruder in the removal stream for further reacting the intermediate to form a polymer product.

21. The reactor of claim 16 wherein the removal stream includes a dynamic mixer, and the dynamic mixer is a planetary roller extruder.

* * * * *